United States Patent [19]
Kuenzel

[11] 3,812,815
[45] May 28, 1974

[54] SAFETY ATTACHMENT
[76] Inventor: Robert R. Kuenzel, 2706 Gilbert, Missoula, Mont. 59801
[22] Filed: Jan. 10, 1973
[21] Appl. No.: 322,295

[52] U.S. Cl.................. 116/28 R, 40/175, 116/173, 248/223
[51] Int. Cl. .................................................... B60q
[58] Field of Search.......... 116/28 R, 173, 174, 175, 116/56, 57; 248/43, 223, 298; 224/39 R, 42.45 R; 46/175

[56] References Cited
UNITED STATES PATENTS

| | | | |
|---|---|---|---|
| 1,294,170 | 2/1919 | Robinson............................ | 116/174 |
| 2,753,439 | 7/1956 | Greenfield......................... | 116/28 X |
| 2,793,604 | 5/1957 | Paparra............................. | 116/56 X |
| 3,021,755 | 2/1962 | Karchenes...................... | 116/63 P X |
| 3,099,243 | 7/1963 | Schwartz et al................... | 116/28 R |
| 3,213,823 | 10/1965 | Levy et al........................ | 116/173 X |

FOREIGN PATENTS OR APPLICATIONS

| | | | |
|---|---|---|---|
| 260,505 | 8/1949 | Switzerland........................... | 248/42 |

*Primary Examiner*—Louis J. Capozi
*Attorney, Agent, or Firm*—Robert C. Baker

[57] ABSTRACT

The safety attachment is for a vehicle of the type having a frame with an elongated slot through which an axle perpendicularly extends and along which the axle may be slidably adjusted and fixed at different locations. The safety attachment comprises an elongated member with the opposite ends thereof extending as arms in angular relationship to each other. One of the arms comprises a vehicle mounting bracket and the other a holder member. The vehicle mounting bracket includes a substantially flat arm portion having an opening therein for reception of an end of the vehicle axle therethrough, plus a rigid pin projecting substantially perpendicularly away from the flat arm portion at a location spaced from the axle-receiving opening. The pin is adapted to project into the elongated slot of the vehicle frame and ride in that elongated slot. Fixing of the mounting bracket to the vehicle is accomplished by sliding the opening of the substantially flat arm portion over the axle and simultaneously inserting the pin into the elongated slot of the vehicle frame, thereby to substantially prevent pivoting of the bracket about the axle. A resilient pole, suitably fluorescent for attention-getting qualities, is carried by the arm forming the holder member; and a ball and flag may be carried by the pole. The safety attachment creates a high profile for low profile vehicles.

11 Claims, 3 Drawing Figures

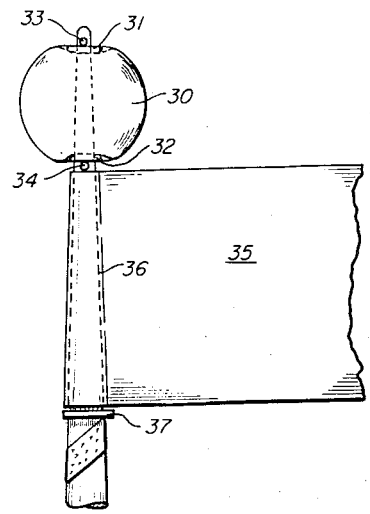
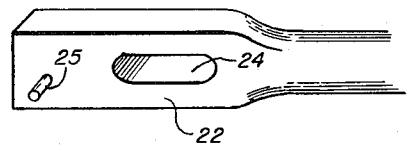
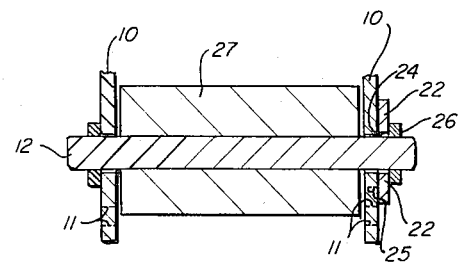
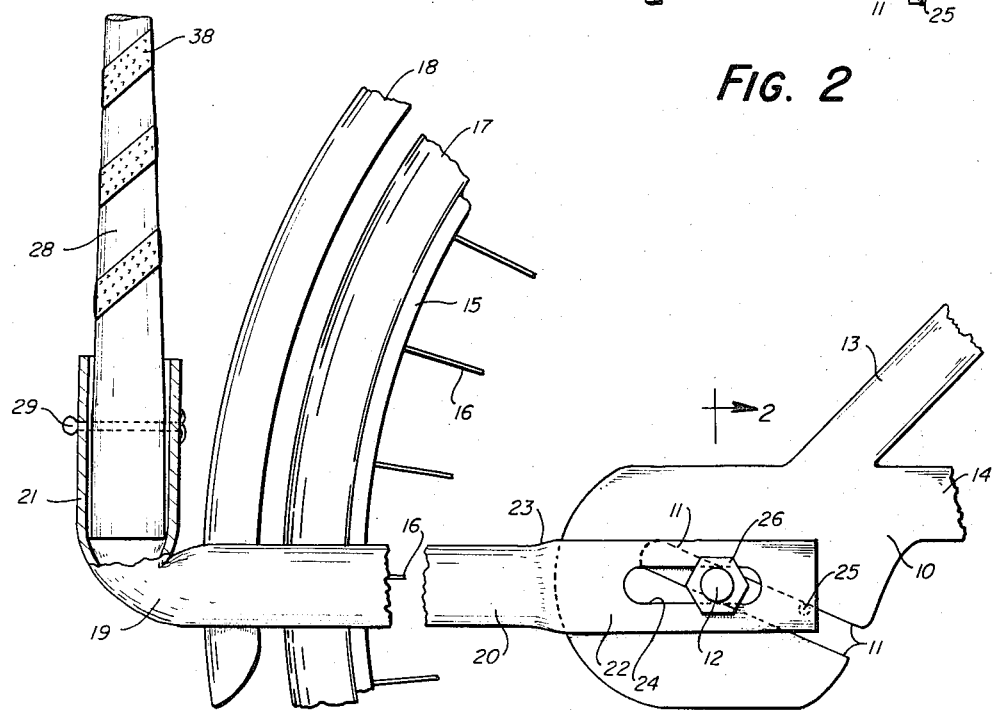
FIG. 3
FIG. 2
FIG. 1

SAFETY ATTACHMENT

This invention relates to a safety attachment for vehicles, and more particularly, to an improved safety attachment having a special mounting bracket which structurally cooperates with structural features of the frame of the vehicle so as to permit secure bracket attachment to the vehicle in an extraordinarily simple way. The invention also relates to a safety attachment having an improved attention-getting high profile visual structure for safety protection of persons using low profile vehicles (such as, for example, bicycles).

The teachings of this invention are especially useful on bicycles and motorcycles, but use of the teachings hereof is not limited to use on such vehicles.

A multitude of patents deal with attachment elements, brackets, safety attachments and the like; and the following known prior art is listed as illustrative: Addition, U.S. Pat. No. 1,798,052; Hoffmann, U.S. Pat. No. 2,226,159; Hamilton, U.S. Pat. No. 2,701,540; Parker, U.S. Pat. No. 2,741,948; Pobanz et al., U.S. Pat. No. 2,748,745; Stevens, U.S. Pat. No. 2,817,539; Schwartz et al., U.S. Pat. No. 3,099,243; Hopkins, U.S. Pat. No. 3,241,516; Sharkey et al., U.S. Pat. No. 3,433,203; Hertoghe et al., U.S. Pat. No. 3,438,651; Rich, Jr., U.S. Pat. No. 3,586,348; Logan, U.S. Pat. No. 3,683,842.

The safety attachment of this invention, however, is completely different from anything heretofore suggested, insofar as is known.

A critical feature of this invention is that the bracket means for the safety attachment is especially designed for a vehicle of the type having a frame with an elongated slot through which an axle or equivalent perpendicularly extends and along which the axle or equivalent may be slidably adjusted and fixed at different locations. The axle or equivalent may or may not be at the axis of a wheel for the vehicle. The frame may have an elongated slot through which a bolt perpendicularly extends and along which the bolt may be slidably adjusted and fixed at different locations; and this is considered the equivalent of an axle according to the teachings hereof.

Primarily, however, reference is made to bicycles which have rear wheels mounted on an axle which extends perpendicularly through an elongated slot of the frame and is slidably adjustable to different positions along the elongated slot. This is desirable and necessary for bicycles inasmuch as the sliding of the axle within the slot of the frame is employed for adjusting the tightness of the chain drive of the bicycle.

The safety attachment of the invention comprises an elongated member with opposite ends thereof extending as arms. Preferably, the arms are at angular relationship to each other; and the angular relationship is between about 40° and 140°, with an angle of about 90° being most preferred. One of the arms comprises a vehicle mounting bracket and the other of the arms comprises a holder member.

The vehicle mounting bracket includes a substantially flat arm portion; and the flat portion of the arm preferably lies in a plane which is substantially parallel to the other arm (that is, the holder arm). The substantially flat arm portion has an opening therein, preferably elongated or slot-like for adjustment reasons, through which an end of the axle of the vehicle is adapted to be received. Further, a rigid pin projects substantially perpendicularly away from the substantially flat arm portion at a location spaced from the opening in that flat arm portion. This pin is adapted to project into and ride in the elongated slot of the frame of the vehicle.

The fixing of this mounting bracket arm to the vehicle is accomplished by sliding the opening in the substantially flat arm portion over the axle of the vehicle; and simultaneously, the pin projecting away from the substantially flat arm portion is inserted into the elongated slot of the vehicle frame. The pin serves to substantially prevent pivoting action of the bracket about the mounting of the bracket on the axle. To be recognized is that the bracket arm of the safety attachment hereof may then be fixed to the vehicle simply by threading a nut or equivalent obstruction or abuttment member upon the axle or equivalent. The result is that the bracket arm is pressed against solid frame parts of the vehicle adjacent the elongated slot of the frame; and the bracket arm is held in substantially non-pivoting condition in that position.

The other arm, or the holder arm, of the safety attachment preferably includes a tubular recess extending into the end thereof. In fact, the elongated member of the safety attachment preferably is formed from tubular stock and is in the nature of a tubular shaft, bent so that its ends project at angles to each other as aforenoted, and flattened at one end to form the bracket portion as aforenoted.

A pole is adapted to be fitted into the recess of the holder arm and then suitably fastened therein as by means of a pin or the like. The pole suitably is resilient and preferably is made out of materials such as organic plastics or fiberglass or combinations thereof. A ball or globe may be fitted on the pole as well as a flag or the like, as desired.

Reflective materials such as fluorescent paints or tapes or the like, or reflex-reflecting paints or tapes or the like, may completely cover the pole as well as the ball and flag or cover only portions of the structure in various pattern arrangements, as desired and necessary for maximum attention-getting qualities.

The invention will further be described by reference to a drawing made a part hereof wherein:

FIG. 1 is a schematic side plan view of a safety attachment according to the invention fixed in position at the rear axle of a bicycle, with substantial portions broken away;

FIG. 2 is a schematic prepresentation of a cross-sectional view taken along line 2—2 of FIG. 1; and FIG. 3 is a schematic isometric view showing the inner side (i.e., the side opposite the side viewed in FIG. 1) of the flattened arm portion 22 of the safety attachment.

First to be described will be the critical structural features of a vehicle for which the safety attachment is designed. As illustrated in the drawing, this vehicle, preferably a bicycle, has a frame 10 with an elongated slot 11 in it. The slot may extend as a cut from a peripheral portion of a frame element, as illustrated; or it may simply be a cut out portion completely surrounded by frame material. The slot suitably receives the rear axle 12 of a bicycle. The axle 12 extends substantially horizontally and perpendicularly through the slot 11. Further, the axle 12 can slide along the slot for adjustment of its location within the slot 11, which simultaneously adjusts the tension of the drive chain (not shown) in the case of a bicycle. To be recognized is that the part of a bicycle frame 10 carrying the aforenoted slot 11 is generally approximately at the intersection of a rod or shaft 13 extending generally upward (under the seat of a bicycle) and a rod or shaft 14 extending horizontally toward the sprocket for the bicycle pedals. Rear portions of a bicycle shown in the drawing include parts of the following elements: rim 15 for the rear wheel, spokes 16, tire 17, and rear fender 18. Bicycle portions other than those aforenoted form no part of the structural arrangements considered important in describing and understanding this invention. The hub for the rear bicycle wheel is omitted from FIG. 1 to improve the clarity of the showing for the features of this invention.

The safety attachment of this invention critically comprises an elongated member or shaft 19, preferably formed out of tubular stock. The opposite ends of this elongated member extend as arms 20 and 21. These arms 20 and 21 preferably should be at angular relationship to each other, varying from 40° to 140°; and they most ideally are at approximately 90° from each other, as illustrated in the drawing. The angular relationship between the arms of the elongated member is suitably formed simply by bending a tubular straight shaft at some intermediate point along its length; but alternately, the elongated member could be formed by welding or otherwise fastening together two arm members.

One of the arms 20 of the elongated member forms a mounting bracket and the other arm 21 forms a holder member.

The vehicle mounting bracket arm 20 includes a substantially flattened arm portion 22. The flattened portion of arm 20 suitably extends sufficiently along a length of arm 20 to present a substantially flat part of arm 20 for contact engagement with frame parts 10 of the vehicle; and illustratively, arm 20 is flattened from about a crease line 23 to the end of arm 20. The plane of the flattening for the arm portion 22 should lie essentially parallel to the plane of the direction of projection of the holder arm, particularly in cases where the holder arm is to be employed for holding a pole or the like in some upstanding relationship at the rear portion of the bicycle. An opening 24 is formed in the flattened portion of the bracket arm; and this opening is designed for receiving through it the axle 12 or equivalent part of the vehicle. In other words, one end of the axle 12 extends through the opening 24 of the flattened portion 22 of the bracket arm 20. Further, it is desirable that the opening 24 through the flattened portion of the bracket arm be in the nature of a slot or the like, suitably with expanding size or width from one end to the other along the slot. A slot opening permits adjustment of the position of the bracket arm with respect to the axle extending through it; and in addition, a slot opening, especially of gradually expanding size, permits the reception of axles of varying size through it.

A rigid pin 25 is fixed to and projects substantially perpendicularly away from the flattened portion 22 of the bracket arm 20; and the location of this rigid pin 25 on the flattened portion of the bracket arm is necessarily spaced from the location of the opening 24 of the flattened portion 22. This pin 25 is adapted to project into the elongated slot 11 of the frame 10 of the vehicle. The pin 25 projects into the elongated slot 11 of the frame 10 and rides along one edge of the elongated slot 11 as the bracket 20 part of the device is fixed to the vehicle frame 10.

Fixing of the mounting bracket arm 20 to the vehicle is easily accomplished by sliding the opening 24 of the flattened bracket part 22 over the axle 12 of the vehicle, and simultaneously inserting the pin 25 of the flat bracket arm into the elongated slot 11 of the frame 10 of the vehicle. The parts interlock; and this tends to prevent pivoting of the bracket arm 20 about the axle 12 of the vehicle. However, the exact positioning of the bracket arm 20 on the axle 12 of the vehicle may nevertheless be adjusted by sliding the bracket arm slot opening 24 with respect to the axle 12. This is desirable since bicycles and other vehicles vary in structural detail from one vehicle to the next. Adjustability permits affixing of the safety attachment bracket arm 20 in a manner which will cause that bracket arm 20 to project substantially horizontally toward the rear from the axle 12. The slotted opening 24 of the flat bracket arm 22 permits shifting of that part as well as shifting of the exact location of the pin 25 along the slot 11 of the frame of the vehicle; and this action permits one to gain a relationship between the pin 25 and the location of the axle 12 in the slot 24 which effectively causes a horizontal position for the bracket arm 20.

After positioning the bracket arm 20 as illustrated, a nut 26 or other abuttment member or fastener is fitted on axle 12 to hold the bracket arm 20 in position on the axle.

The cross-sectional view of FIG. 2 illustrates the fact that the axle 12 ordinarily will carry a hub part 27 for the rear wheel of a bicycle, and the fact that a frame part 10 and slot 11 will ordinarily be on each side of hub 27 for carrying the axle 12.

A pole 28 or the like is suitably fitted into the recess of the holder arm 21 and fastened in that recess by inserting a pin 29 through preformed openings or holes in the holder arm and through the pole itself. The pin 29 may be one adapted to remain in position as a result of a friction fit, or tight fit, within the hole extending through the pole; or alternately, a cotter key type pin, or other fastening means, may be employed.

A ball 30 or other object may be attached to the upper end of the pole by any suitable means. Illustratively, a flexible rubber ball may be attached to the upper end of the pole by preforming a hole through the ball and then sliding it over the end of the pole with washers 31 and 32 on the pole 28 on opposite sides of ball 30. The washers (suitably of a flexible composition such as nylon or rubber or other plastic) are suitably compressed or pressed into the material of the ball 30 on opposite sides of it in the direction parallel to the pole 28; and pins 33 and 34 or other fasteners suitably are inserted into preformed holes in pole 28 to hold the washers 31 and 32 in position.

The addition of a flag 35 to the pole is easily accomplished by sewing a loop 36 at one end of the flag material and inserting the pole through the loop. A friction-fit fiber washer 37 may be employed to hold the flag at a selected position on the pole and prevent it from sliding downwardly along the pole. The flag 35 may be formed out of any desired material, whether flexible or relatively rigid. A nylon fabric flag of fluorescent orange color is especially preferred.

A reflective material 38 such as a coating or tape may be added to the pole as a spiral covering, as illustrated in the drawing; and this is especially effective as an attention-getting feature. The material 38 may be of a fluorescent material for ready visibility and attention-getting qualities under a variety of daytime and nighttime conditions, or it may be of other attention-getting readily visible material (such as, for example, a reflex-reflecting material which retro-directs lights as from the headlights of an automobile back in a cone toward the source of the light so that the driver of the automobile is alerted). Fluorescent reds or oranges are especially desirable reflective materials for use. A variety of patterns for reflective material may be employed on the pole or flag or ball in any combination, as desired. Indeed, the entire surfaces of those elements may be covered with reflective material, whether by coating or by addition of a layer of tape or the like.

Illustratively, the pole 28 may be of such flexible but yet semi-rigid character that it functionally will whip back and forth as it is carried by a vehicle, thus further contributing to the attention-getting features of the device. A fiberglass or plastic pole of about 6 feet in length is especially useful. The pole should be at least about 4 feet in length to create a generally high profile, and usually need not be over about 8 feet in length. While the shaft thickness of the pole may vary greatly, a tapered cylindrical shaft is preferred—suitably from a base diameter at one end of about one-half inch to a tip diameter of approximately one-eighth inch or larger. The extent to which the pole will whip back and forth as a vehicle moves is desirably limited as necessary to avoid generating a safety hazard. Thus, poles for bicycles should be relatively rigid but yet allow for sufficient whip action to cause the ball 30 and flag 35 to shift back and forth for attention-getting results. The weight of the ball, slight though it is, contributes to a generation of desirable whip action as well as a retardation or inhibition of wild erratic whip action. In effect, the ball 30 contributes to a pendulum type whip action, and also serves the function of a safety element for the tip of the pole to substantially prevent that tip from causing severe scratches or bodily harm. A ball around 2 to 8 inches in diameter can be useful for this purpose; and a diameter of about 6½ inches is generally preferred.

By applying a reflective surfacing material in a pattern which completely surrounds the pole 28, the attention-getting qualities of the device are evident regardless of the surface angle at which it is viewed. A reflective covering, such as a fluorescent covering, desirably should be so extensive for bicycle use as to approach a total area of coverage around the pole of at least about 10 square inches up to about 50 or more square inches; but this may vary depending on the pattern and the specific usage selected for the device.

A desirable size for the flag 35 is about 16 by 12 inches. The primary function gained by including a flag on the device is that of easy detection of it by motorists under a great variety of conditions. The height of the flag 35 makes it easily seen over parked or moving automobiles, over bushes and hedges, and the like.

An illustrative elongated member 19 is one formed out of a 20 inch length of one-half inch diameter aluminum tubing, bent at an angle of about 90° so that one arm 20 is about 16 inches in length and the other arm 21 is about 4 inches in length. The flattened portion 22 of arm 20 may vary from as little as about an inch in length up to about 6 or more inches in length, with a flat section of about 2 inches being generally suitable.

The slot opening 24 may be about one-half inch wide in the flattened section 22; and projecting abuttment pin 25 normally need not be over about three-eighths inch in length and about three-sixteenths inch in diameter. Pin 25 is not visible to a viewer looking at bracket arm 20 from the outside.

Interestingly, a member 19 of the total size just noted serves to place the pole 28 about 16 inches to the rear of the rear axle of a bicycle and enables a rider to get on and off of the bicycle freely. Further, the member 19 should be formed out of relatively easily bent or broken material, whether metal or organic plastic or other material, so that in an emergency it will bend or break without causing major injury to anyone pushed or bumped against the device.

A major benefit of the invention is that of providing an effective high profile safety structure of extraordinary total simplicity and economy of fabrication. Safety specialists generally consider low profile to be a leading cause of accidents involving bicycles, motorcycles, mini-bikes, snowmobiles, and the like. The low profile for these vehicles and their riders makes it difficult for automobiles and truck drivers to notice them. The teachings hereof are useful to greatly increase the profile height for users of low profile vehicles, and thereby assist in the elimination of low profile accidents.

That which is claimed is:

1. A safety attachment for a vehicle of the type having a frame with an elongated slot through which an axle perpendicularly extends and along which said axle may be slidably adjusted and fixed at different locations, said safety attachment comprising an elongated member with the opposite end portions thereof extending as arms, one of said arms comprising a vehicle mounting bracket and the other of said arms comprising a holder member, said arm comprising said vehicle mounting bracket including a substantially flat end portion, said substantially flat end portion having an opening therein for reception of an end of said axle therethrough, and a rigid pin projecting substantially perpendicularly away from said substantially flat end portion at a location spaced from said opening, said pin being adapted to project into the elongated slot of said frame and ride in said elongated slot, the fixing of said mounting bracket to said vehicle being accomplished by sliding the opening of the substantially flat end portion thereof over said axle and simultaneously inserting said pin into the elongated slot of said frame, thereby to substantially prevent pivoting of said bracket about said axle.

2. The safety attachment of claim 1 wherein said arms of said elongated member extend outwardly in angular relationship to each other, said angular relationship between said arms being between about 40° and 140°.

3. The safety attachment of claim 2 wherein said angular relationship between said arms is approximately 90°.

4. The safety attachment of claim 2 wherein said substantially flat end portion of said arm comprising said mounting bracket lies in a plane substantially parallel to the projection of said other arm.

5. The safety attachment of claim 1 wherein said opening in said substantially flat end portion comprises an elongated slot opening, permitting adjustment of the location of said end portion on said axle.

6. The safety attachment of claim 1 wherein said holder member comprises a tubular recess into the end thereof.

7. The safety attachment of claim 1 wherein said elongated member is fabricated from tubular stock.

8. The safety attachment of claim 1 additionally comprising a resilient pole held by said holder member.

9. The safety attachment of claim 8 additionally comprising a globular member on the upper end of said pole.

10. The safety attachment of claim 8 additionally comprising a flag on said pole.

11. The safety attachment of claim 8 additionally comprising fluorescent reflective material on said pole.

* * * * *